(12) United States Patent
Bonnet et al.

(10) Patent No.: US 12,088,142 B2
(45) Date of Patent: Sep. 10, 2024

(54) IDENTIFYING A POWER SUPPLY SOURCE

(71) Applicant: Eaton Intelligent Power Limited, Dublin (IE)

(72) Inventors: Remi Bonnet, Tencin (FR); Pierre-Olivier Salla, La Combe de Lancey (FR)

(73) Assignee: EATON INTELLIGENT POWER LIMITED, Dublin (IE)

( * ) Notice: Subject to any disclaimer, the term of this patent is extended or adjusted under 35 U.S.C. 154(b) by 462 days.

(21) Appl. No.: 17/616,729

(22) PCT Filed: Jun. 5, 2020

(86) PCT No.: PCT/EP2020/065714
§ 371 (c)(1),
(2) Date: Dec. 6, 2021

(87) PCT Pub. No.: WO2020/245418
PCT Pub. Date: Dec. 10, 2020

(65) Prior Publication Data
US 2022/0302746 A1    Sep. 22, 2022

(30) Foreign Application Priority Data
Jun. 7, 2019 (GB) ..................... 1908121

(51) Int. Cl.
*H02J 9/06* (2006.01)
*G06F 1/28* (2006.01)
(Continued)

(52) U.S. Cl.
CPC ............... *H02J 9/062* (2013.01); *G06F 1/28* (2013.01); *H02J 13/00012* (2020.01);
(Continued)

(58) Field of Classification Search
CPC ... G06F 1/28; H02J 13/0001; H02J 13/00012; H02J 2310/16; H02J 9/062; H04L 27/34; Y04S 20/12
See application file for complete search history.

(56) References Cited

U.S. PATENT DOCUMENTS 9,182,795 B1 *  11/2015  Hill .......................... H04B 3/54
9,608,440 B2    3/2017  Familiant et al.
(Continued)

FOREIGN PATENT DOCUMENTS

DE           4001265 A1    7/1991
WO    WO 2016099938 A1    6/2016

OTHER PUBLICATIONS

Jing Lu, et al., "Asymmetric PSK Constellation Design to Minimize Distortion in PCM Data Transmission", Sarnoff Symposium, Apr. 28, 2008, pp. 1-5, IEEE, Piscataway, New Jersey, USA, XP031252541.

*Primary Examiner* — Terrell S Johnson
(74) *Attorney, Agent, or Firm* — LEYDIG, VOIT & MAYER, LTD.

(57) ABSTRACT

A method for identification of a power supply source, a power supply system and a system having at least one load is disclosed. The at least one load receives power from the power supply system and makes measurements of the AC output signal of the power supply source. A supervisory device operatively coupled to the at least one load is disclosed. The supervisory device receives measurements from the at least one load and determines an identification of the power supply source of the power supply system by demodulating and decoding the received measurements.

15 Claims, 3 Drawing Sheets

(51) Int. Cl.
*H02J 13/00* (2006.01)
*H04L 27/34* (2006.01)

(52) U.S. Cl.
CPC ....... *H02J 13/0001* (2020.01); *H02J 2310/16* (2020.01); *H04L 27/34* (2013.01); *Y04S 20/12* (2013.01)

(56) References Cited

U.S. PATENT DOCUMENTS

| | | | |
|---|---|---|---|
| 2006/0044117 A1* | 3/2006 | Farkas | H05K 7/1498 713/340 |
| 2009/0039833 A1* | 2/2009 | Kitagawa | H01M 10/48 320/134 |
| 2013/0116946 A1 | 5/2013 | Familiant et al. | |

* cited by examiner

IDENTIFYING A POWER SUPPLY SOURCE

CROSS REFERENCE TO RELATED APPLICATIONS

This application is a U.S. National Phase application under 35 U.S.C. § 371 of International Application No. PCT/EP2020/065714, filed on Jun. 5, 2020, and claims benefit to British Patent Application No. GB 1908121.5, filed on Jun. 7, 2019. The International Application was published in English on Dec. 10, 2020 as WO 2020/245418 A1 under PCT Article 21(2).

FIELD

This disclosure relates to identifying a power supply source, in a datacenter with multiple power supplies and endpoints in datacenters. The disclosure also relates to identification of a power network topology, such as a power chain comprising sources and distribution units.

BACKGROUND

Nowadays, almost all IT servers offer multiple power supplies (at least two) to provide redundancy and, thus, to improve availability. The best practice is to connect each supply on a separate power supply source. Most of the time this is done by connecting each supply to a separate PDU (Power Distribution Unit), with each of these PDUs being themselves connected to a separate UPS (Uninterruptible Power System/Supply).

In this architecture, identifying the entire power chain, i.e. identifying which PDU is connected on which UPS, is critical to ensure that no mistake is made in the power cabling. Moreover, operators and technicians are looking for simple and robust methods to automatically check that dual supplies are not connected to the same power supply source.

The international patent application WO2016/099938A1 discloses the signaling of the status of a power supply source, for example an UPS, by controlling a waveform of an AC voltage generated from the power supply source.

The US patent U.S. Pat. No. 9,608,440 relates to power distribution systems and methods and, more particularly, to systems and methods for monitoring and/or controlling power distribution systems. In embodiments, a component of a power distribution network, such as an uninterruptible power supply (UPS), is operated to generate a disturbance in at least a portion of the power distribution network. At least one node of the network experiencing the disturbance is identified and a topology of the power distribution network is determined responsive to identifying the at least one node.

The US patent application US 2006/044117 A1 relates generally to power systems, and more particularly to managing the load on components in a power system. According to an embodiment, power system components are mapped using a controller and a data collection system. The controller is operable to transmit a first power system component ID for the first power system component to a second power system component, wherein the second power system component receives power from the first power system component. The data collection system is operable to receive from the second power system component the first power system component ID and a second power system component ID for the second power system component. The data collection system is further operable to associate the first power system component with the second power system component based on the received IDs.

The US patent U.S. Pat. No. 9,182,795 discloses a power distribution system, which includes two or more power components that distribute power to one or more electrical components. At least some of the power components send and receive signals over power transmission lines to upstream or downstream power components in the power distribution system. The signals include information about power components in the power distribution system.

SUMMARY

In an embodiment, the present disclosure provides a method for identification of a power supply source comprising providing an AC output signal by the power supply source and signaling an identification of the power supply source by modulating the AC output signal of the power supply source using a combination of an amplitude and frequency shift keying.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
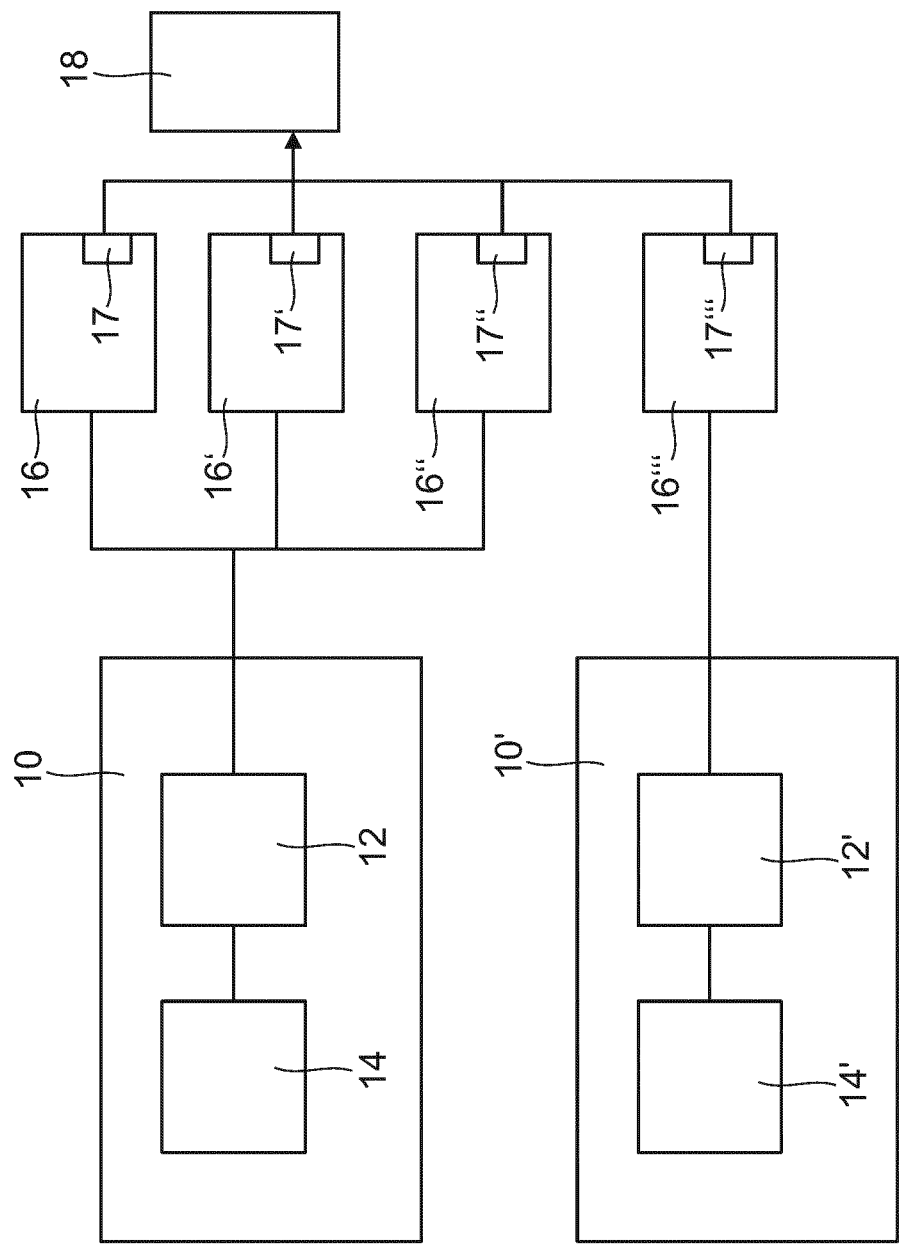
FIG. 1 is a schematic diagram illustrating a system according to an embodiment.

This disclosure relates to identifying a power supply source in a datacenter with multiple power supplies and endpoints in datacenters. It also relates to identification of a power network topology, such as a power chain comprising sources and distribution units.

According to aspects of this disclosure, a modulation technique using a combination of amplitude and frequency shift keying for signaling an identification of a power supply source with its AC output signal is used. The modulation technique in the context of this disclosure comprises any modulation using a combination of amplitude and frequency shift keying and allowing to transmit two or more information signals over the AC output signal of the power supply source as carrier with both information signals, particularly in quadrature with each other. This modulation has the advantage that the bit-rate can be increased in contrast to the mere controlling of a single parameter of an AC output signal such as the amplitude so that with a very low frequency modulation a relatively large amount of data can be signaled within a shorter time span, which makes it suitable for usage with power supplies such as an UPS operated in backup or battery mode with a limited operating time.

According to one aspect of this disclosure, a method for identification of a power supply source is provided, which comprises providing an AC output signal by the power supply source, and signaling an identification of the power supply source by modulating the AC output signal of the power supply source using a combination of an amplitude and frequency shift keying.

The signaling of an identification of the power supply source by modulating the AC output signal of the power supply source using a combination of an amplitude and frequency shift keying may comprise generating a frame of symbols encoding an identifier of the power supply source, and transmitting the generated frame by modulating the AC output signal of the power supply source using a combination of an amplitude and frequency shift keying.

The generating of a frame of symbols encoding an identifier of the power supply source may comprise encoding the identifier of the power supply source by a number of bits of the frame, and, in some embodiments, using a number of bits for an error code correction.

The modulation may use a modulation frequency, which is much lower than the frequency of the AC output signal. The modulation frequency may be below 10 Hertz. In some embodiments, the modulation frequency may be between 1 Hertz and 10 Hertz. In some embodiments, the modulation frequency may be below 1 Hertz, for example 0.1 Hertz, or even below 0.1 Hertz.

The modulation frequency may be selected such that the time span of completely signaling the identification of the power supply source is between 1 second and 15 minutes, and typically about 30 seconds or shorter than 30 seconds.

The modulation parameters (voltage and frequency shift) as well as the modulation frequency itself (i.e. the symbol rate) may be configurable in order to adapt to power chain constrains and power quality requirements.

In some embodiments, the amplitude and phase of the AC output signal may be varied according to a predefined modulation scheme, for example a Quadrature Amplitude Modulation like scheme such as a scheme similar to QAM4, QAM 16 or QAM64.

In some embodiments of this disclosure, a power supply system is provided, which comprises a power supply source providing an AC output signal, and a control circuit configured to signal an identification of the power supply source by modulating the AC output signal of the power supply source using a combination of an amplitude and frequency shift keying.

The power supply source may comprise an UPS and wherein the control circuit is configured to operate an inverter of the UPS to signal the identification. The power supply system may comprise an interface for receiving one or more signals for controlling the modulating the AC output signal of the power supply source by the control circuit.

In an embodiment, this disclosure relates to a supervisory device for operatively coupling to at least one load being supplied by a power supply system as herein described and configured to make measurements of the AC output signal of a power supply source of the power supply system, wherein the supervisory device is configured to receive the measurements from the at least one load and to determine an identification of the power supply source of the power supply system by demodulating and decoding the received measurements.

The supervisory device may be configured to determine a power chain topology by matching the parameters of the modulation of the AC output signals of the power supply sources with the demodulated and decoded measurements received from loads.

In some embodiments, the demodulation (and optionally the decoding) is performed in the at least one load. The load then transmits the demodulated (and decoded) symbols, which are or represent the identifier of the power supply source, through a communication interface to the supervisory device.

The supervisory device may be configured to control one or more parameters of modulating the AC output signal of the power supply source. The supervisory device may be configured to adapt the control of one or more parameters of modulating the AC output signal of the power supply source depending on the at least one load, for example on a property of the at least one load, such as the measurement capability or accuracy of the at least one load.

According to a yet aspect of this disclosure, a system is provided, which comprises at least one load configured to be supplied by a power supply system as herein described and configured to make measurements of an AC input signal, wherein each load comprises an interface for sending a measurement result, and a supervisory device as described herein and being operatively coupled to the interface of the at least one load and being configured to receive the measurements from the at least one load and to determine an identification of the power supply source of the power supply system by demodulating the measured signal and decoding the received measurements. As already described, each load, or only one or more of the loads, may also be configured to demodulate the measured signal, and optionally to decode the demodulated measured signal. In this case, the demodulated (and decoded) symbols are sent through the interface to the supervisory device.

The details of one or more embodiments are set forth in the accompanying drawings and the description below. Other features and advantages will be apparent from the description and drawings, and from the claims.

In the following, functionally similar or identical elements may have the same reference numerals. Absolute values are shown below by way of example only and should not be construed as limiting.

This disclosure describes a very low frequency modulation technique of the amplitude and frequency of a power supply source AC output signal so that devices connected to the power supply source can identify the source from which they are supplied by measuring the amplitude and frequency of the power supply output signal. As the modulation technique applied uses a very low modulation frequency of only some Hertz, for example, below 1 Hertz, this power supply source identification solution can be applied to almost all manageable devices particularly by use of a supervision software.

A manageable device is a device, which is configured to retrieve and/or receive messages through a communication port, for instance the IPM I (Intelligent Platform Management Interface) of IT servers or SNMP (Simple Network Management Protocol) interfaces of UPS and power distribution units. In that way, a demodulation algorithm for determining the identification of a power supply source does not need to be embedded inside devices. For example, Eaton's UPS supervisory software may acquire device's measurements during a pairing campaign. Once done, this software can then post-process the acquired measurements, demodulating and decoding an UPS identification. However, at least parts of the methodology may be also embedded in manageable devices, for example demodulation algorithms, or demodulation and decoding algorithms (which may include error correction) could be embedded in manageable devices.

To increase the bit-rate while keeping modulation frequency low, a Quadrature Modulation (QM) of amplitude and frequency of a power supply source AC output signal is applied. By applying QM, the number of bits contained in each symbol can be increased, and the frame time may be decreased, or the throughput may be maximized which makes it suitable for an application requiring quick power chain topology identification.

Moreover, to increase communication robustness (against noise, load impacts, . . . ) an error code correction can be appended to the payload data to form a frame.

FIG. 1 shows a system comprising two power supply systems 10, 10', each having a UPS 12, 12' as power supply source and a control circuit 14, 14' for modulating the AC output signal of the power supply source with a QM technique. The control circuit 14, 14' can for example control the generation of the AC output signal by means of the inverter of the UPS 12, 12', or by means of a standalone modulator receiving the output signal of the inverter of the UPS 12, 12' and modulate the received signal to generate the modulated AC output signal.

In the exemplary constellation shown in FIG. 1 the power supply system 10 supplies three loads 16, 16', 16", for example data processing devices such as IT servers located in the same rack in a datacenter, or PDUs (which may also be integrated in data processing devices) or another power supply source such as a UPS and more generally any power device providing AC input signal monitoring capability.

Each of the loads 16, 16', 16" can be equipped with a communication apparatus (such as IPMI) 17, 17', 17" for communicating with one or more supervisory devices 18, for example a controller being configured to execute a software, for example a data center supervisory software.

The power supply system 10' supplies one load 16''', which may be another IT server located in another rack in the datacenter. Also, load 16''' can be equipped with an IPMI 17''' for communicating with the supervisory device 18.

The supervisory device 18 could be a standalone controller or embedded into any of the system devices, including one or more (distributed architecture) power device composing the power chain.

Figure 2:
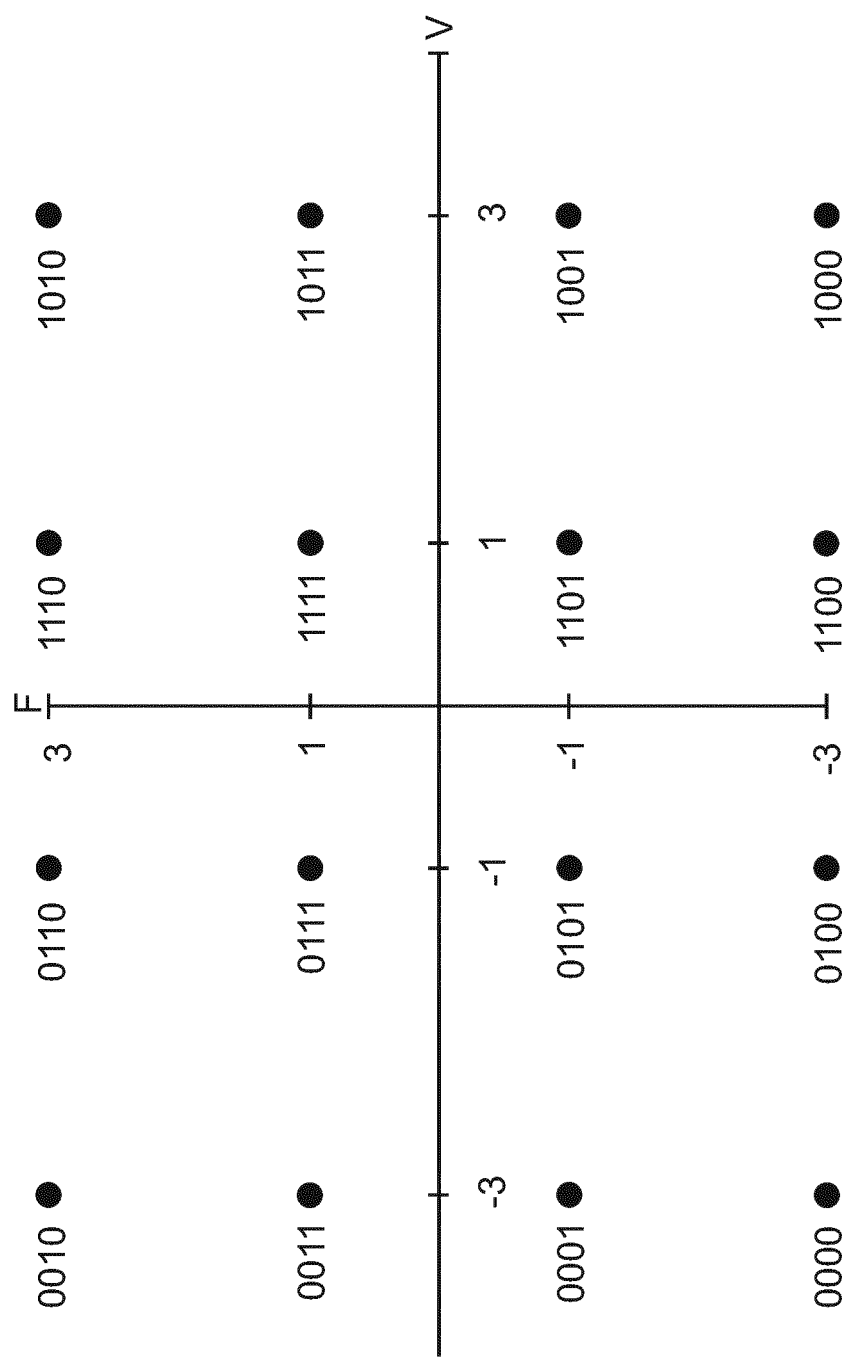
FIG. 2 is a graph illustrating a QAM16 constellation in the voltage-frequency domain of power supply systems according to an embodiment.

The control circuits 14, 14' apply a QM modulation technique so that the AC output signal of each UPS 12, 12' signals an identification of the respective UPS. The control circuits 14, 14' may for example employ a QAM 16 like modulation technique modulating the amplitude and the frequency of the AC output signal as shown in FIG. 2. It should be noted that a QAM like modulation scheme such as QAM 16 is only an example of a modulation scheme suitable for the purpose of identifying a power supply source in a system employing one or more power supplies, but generally any modulation scheme modulating the AC output signal of the power supply source using a combination of an amplitude and frequency shift keying may be applied for identifying the power supply source.

The QAM 16 like modulation technique allows to distinguish 16 different power supply sources by using 4 different amplitude variation levels of −3, −1, +1, +3 Volt and 4 different frequency variation levels of −3, −1, +1, +3 Hertz. If the AC output signal, for example the output voltage, has a default amplitude of 220 Volt and a default frequency of 50 Hertz, the following modulations can be generated with the before mentioned variation levels (refer to the graph of FIG. 2):

| Amplitude (Volt) | Frequency (Hertz) | Power supply source identification code |
|---|---|---|
| 223 | 53 | 1010 |
| 223 | 51 | 1011 |

-continued

| Amplitude (Volt) | Frequency (Hertz) | Power supply source identification code |
|---|---|---|
| 220-223 | 49-50 | 1001 |
| 220-223 | 47-50 | 1000 |
| 220-221 | 50-53 | 1110 |
| 220-221 | 50-51 | 1111 |
| 220-221 | 49-50 | 1101 |
| 220-221 | 47-50 | 1100 |
| 219-220 | 50-53 | 0110 |
| 219-220 | 50-51 | 0111 |
| 219-220 | 49-50 | 0101 |
| 219-220 | 47-50 | 0100 |
| 217-220 | 50-53 | 0010 |
| 217-220 | 50-51 | 0011 |
| 217-220 | 49-50 | 0001 |
| 217-220 | 47-50 | 0000 |

For example, control circuit 14 may modulate the AC output voltage of UPS 12 such that the amplitude is set at 217 Volt and the frequency is set to 47 Hertz, which would assign the identification code "0000" to the UPS 12. Identification code "0001" could be assigned to UPS 12', thus, meaning that the amplitude and frequency of the AC output voltage of this UPS would be set by control circuit 14' at 217 Volt and 49 Hertz, respectively.

The loads 16, 16', 16", 16''' connected to power supply systems 10, 10' measure the AC output voltage supplied by systems 10, 10' over a certain time interval. These measurements are then transmitted by the loads 16, 16', 16", 16''' via their IPMI 17, 17', 17", 17''' to the supervisory device 18.

The above example is a simple usage where only one QAM symbol is sent and without any Error Correction Code (ECC). It should be noted that in a typical use case a frame of several QAM symbols (for instance 8 symbols with 4 symbols of data and 4 symbols of Reed Salomon ECC) may be sent in order to:

extend the number of power supply sources which can be distinguished (for instance 16^4=65536), and add error correction codes.

The transmission of frames of several QAM symbols may be herein considered as a standard asynchronous protocol. The QAM symbols may have a predefined length, e.g 500 ms, or 1000 ms.

The supervisory device 18 can be configured to demodulate and decode the measurements received from the loads 16, 16', 16", 16'''. The supervisory device 18 determines from the demodulated and decoded measurements received from the loads 16, 16', 16" the identification code "0000", which is assigned to UPS 12 being part of the power supply system 10. For the load 16''', the supervisory device 18 determines the identification code "0001" being assigned to UPS 12' being part of the other power supply system 10'. The supervisory device 18 can retrieve the assignments for example for a database containing assignments of identification codes and power supply sources and systems. The database may be for example part of a UPS supervisory software provided for power supply management in a datacenter. The demodulation and/or decoding of the measurement of the AC output signal supplied to the loads 16, 16', 16", 16''' may also be performed by the loads themselves. In such case, the loads can then determine the identification code by themselves and/or transmit it to the supervisory device 18.

Figure 3:
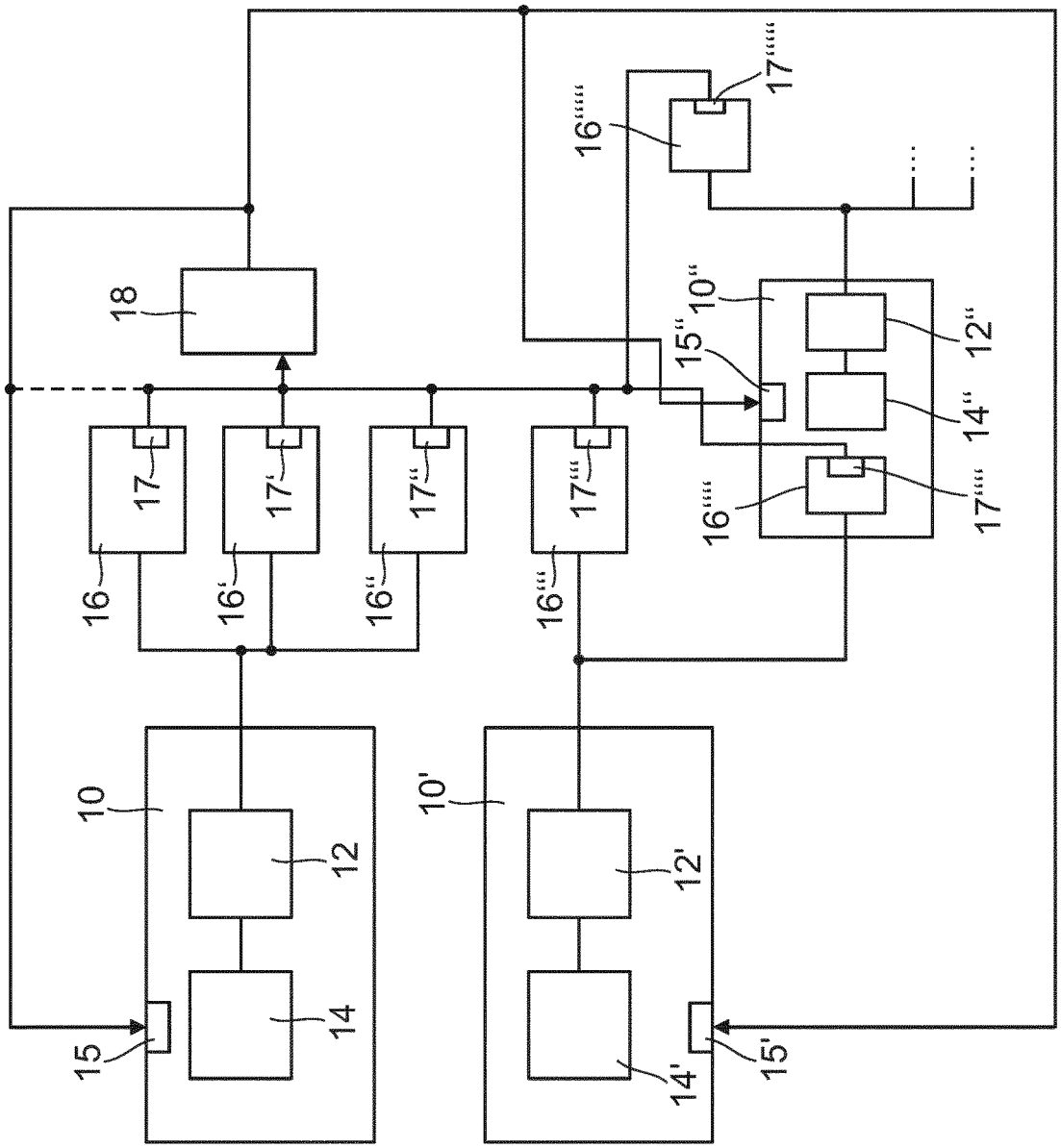
FIG. 3 is a schematic diagram illustrating a system according to an embodiment.

FIG. 3 shows another system comprising three power supply systems 10, 10', 10" each having a UPS 12, 12', 12" as power supply source and a control circuit 14, 14', 14" for modulating the AC output signal of the power supply source with a QM technique, for example as describe above. The control circuit 14, 14', 14" can for example control the generation of the AC output signal by means of the inverter of the UPS 12, 12', 12" or by means of a standalone modulator receiving the output signal of the inverter of the UPS 12, 12', 12" and modulate the received signal to generate the modulated AC output signal.

In the exemplary constellation shown in FIG. 3, the power supply system 10 supplies three loads 16, 16', 16", for example data processing devices such as IT servers located in the same rack in a datacenter, or PDUs (which may also be integrated in data processing devices).

Each of the loads 16, 16', 16" can be equipped with a communication apparatus (such as IPMI) 17, 17', 17" for communicating with a supervisory device 18, for example a controller being configured to execute a software, for example a data center supervisory software.

The power supply system 10' supplies the load 16''', which may be IT servers located in another rack in the datacenter. Also, load 16''' can be equipped with a communication apparatus (such as IPMI) 17''' for communicating with the supervisory device 18. Furthermore, the power supply system 10' supplies the load 16''', which is itself part of the power supply system 10". The power supply system 10" may supply one or more further loads 16'''', for example IT servers located in further racks in the datacenter.

Each load 16 to 16' may communicate via its integrated communication apparatus 17 to 17' with the supervisory device 18.

The supervisory device 18 could be a standalone controller or embedded into any of the system devices, including one or more (distributed architecture) power device composing the power chain.

The control circuits 14, 14', 14" apply a QM modulation technique so that the AC output signal of each UPS 12, 12', 12" signals an identification of the respective UPS. The control circuits 14, 14', 14" may for example employ a QAM 16 like modulation technique modulating the amplitude and the frequency of the AC output signal as shown in FIG. 2. It should be noted that a QAM like modulation scheme such as QAM 16 is only an example of a modulation scheme suitable for the purpose of identifying a power supply source in a system employing one or more power supplies, but generally any modulation scheme modulating the AC output signal of the power supply source using a combination of an amplitude and frequency shift keying may be applied for identifying the power supply source.

The loads 16 to 16'''' connected to the power supply systems 10, 10', 10" measure the AC output voltage supplied by systems 10, 10', 10" over a certain time interval. These measurements are then transmitted by the loads 16 to 16'''' via their IPMI 17 to 17'''' to the supervisory device 18.

The supervisory device 18 can be configured to demodulate and decode the measurements received from the loads 16 to 16''''. The supervisory device 18 determines from the demodulated and decoded measurements received from the loads 16, 16', 16" the identification code "0000", which may be assigned to UPS 12 being part of the power supply system 10. For the loads 16''', 16''', the supervisory device 18 determines the identification code "0001", which may be assigned to UPS 12' being part of the other power supply system 10'. For the load 16'''', the supervisory device 18 determines the identification code "0011", which may be assigned to UPS 12" being part of the third power supply system 10". The supervisory device 18 can retrieve the assignments for example for a database containing assignments of identification codes and power supply sources and systems. The database may be for example part an UPS supervisory software provided for power supply management in a datacenter.

The demodulation and/or decoding of the measurement of the AC output signal supplied to the loads 16 to 16'''' may also be performed by the loads themselves. In such case, the loads can then determine the identification code by themselves and/or transmit it to the supervisory device 18.

Each one of the power supply systems 10 to 10" may be equipped with a communication interface (such as an IPMI interface) 15 to 15" for communicating with the supervisory device 18. The supervisory device 18 may for example configure via the interface 15 to 15" the power supply systems 10 to 10". The configuration may comprise configuring the parameters for modulation and/or demodulation. The configuration may comprise the adapting the modulation to any restrictions the loads could have on the power supply amplitude and/or frequency deviations.

For example, the supervisory device 18 may receive from the loads 16 to 16'''' not only an identification code, but also data regarding power requirements of the respective load. Load 16'''' could for example send data to the supervisory device 18, which are related to special power requirements of the load such as a maximum tolerable deviation of the amplitude and/or frequency of the AC output signal of the power supply system 10'. The supervisory device 18 can then configure the power supply system 10' by sending control signals to the interface 15' for controlling the modulation of the AC output signal performed in the power supply system 10' to meet the requirements of the load 16'''', for example, to use a modulation scheme generating a maximum deviation of the amplitude and/or frequency of the AC output signal as required by the load 16''''.

The supervisory device 18 could also be configured to adapt the modulation scheme to the number of power supply systems. For example, the supervisory device 18 may determine that a high number of power supply systems 10, 10', 10", . . . is used and can then control each power supply system 10, 10', 10", . . . via the interfaces 15, 15', 15", . . . to use a modulation scheme allowing to identify each one of the power supply systems 10, 10', 10", . . . by the supervisory device 18. This may be applicable in large datacenters with a high and varying number of power supply systems. Then, the supervisory device can dynamically adapt the modulation schemes used by the power supply system for identification to the actual number of active power supply systems.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for identification of a power supply source comprising:
   providing an AC output signal by the power supply source, and
   modulating the AC output signal of the power supply source using a combination of an amplitude and frequency shift keying to signal an identification of the power supply source.

2. The method of claim 1, wherein signaling an identification of the power supply source by modulating the AC output signal of the power supply source using the combination of amplitude and frequency shift keying comprises;
   generating a frame of symbols encoding an identifier of the power supply source, and
   transmitting the generated frame by modulating the AC output signal of the power supply source using a second combination of an amplitude and frequency shift keying according to the generated frame.

3. The method of claim 2, wherein generating the frame of symbols encoding the identifier of the power supply source comprises encoding the identifier of the power supply source by a number of bits of the frame, and using a number of bits for an error code correction.

4. The method of claim 1, wherein modulating the AC output signal comprises using a modulation frequency, which is lower than the frequency of the AC output signal.

5. The method of claim 4, wherein the modulation frequency is below 10 Hertz and larger than or equal to 1 Hertz.

6. The method of claim 4, wherein the modulation frequency is selected such that a time span of completely signaling the identification of the power supply source is about 30 seconds or shorter.

7. The method of claim 1, wherein the amplitude and phase of the AC output signal are varied according to a predefined modulation scheme.

8. A power supply system comprising:
   a power supply source providing an AC output signal, and
   a control circuit configured to modulate the AC output signal of the power supply source using a combination of an amplitude and frequency shift keying to signal an identification of the power supply source.

9. The system of claim 8, wherein the power supply source comprises a UPS and wherein the control circuit is configured to operate an inverter of the UPS to signal the identification.

10. The system of claim 8, further comprising an interface for receiving one or more signals for controlling the modulating of the AC output signal of the power supply source by the control circuit.

11. A supervisory device for operatively coupling to at least one load being connected to and supplied by the power supply system of claim 8, wherein the at least one load is configured to make measurements of the AC output signal of the power supply source of the power supply system, wherein the AC output signal is modulated using a combination of an amplitude and frequency shift keying to signal an identification of the power supply source, and wherein the supervisory device is configured to:
    receive the measurements, which are transmitted from the at least one load; and to the supervisory device; and
    determine an identification of the power supply source of the power supply system by demodulating and decoding the measurements.

12. The supervisory device of claim 11, being further configured to control one or more parameters of modulating the AC output signal of the power supply source.

13. The supervisory device of claim 12, being further configured to adapt the control of one or more parameters of modulating the AC output signal of the power supply source depending on the at least one load.

14. The supervisory device of claim 13, being further configured to determine a power chain topology by matching
    the parameters of the modulation of the AC output signal of the power supply source, with
    the demodulated and decoded measurements received from loads.

15. A system comprising:
    at least one load configured to be supplied by the power supply system of claim 8 and configured to make measurements of the AC output signal of the power supply source, wherein the AC output signal is modulated using a combination of an amplitude and frequency shift keying to signal an identification of the power supply source, and
    a supervisory device operatively coupled to the at least one load and configured to receive the measurements, which are transmitted from the at least one load to the supervisory device, and to determine an identification of the power supply source of the power supply system by demodulating and decoding the received measurements.

* * * * *